(No Model.) 2 Sheets—Sheet 1.
H. THIESSEN.
TRICYCLE.
No. 364,782. Patented June 14, 1887.
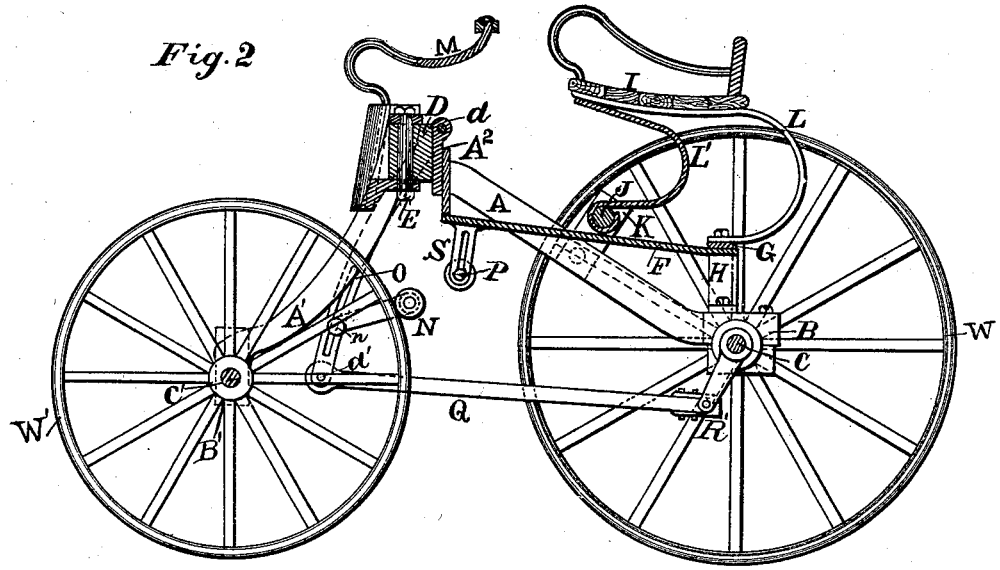
*Fig. 2*
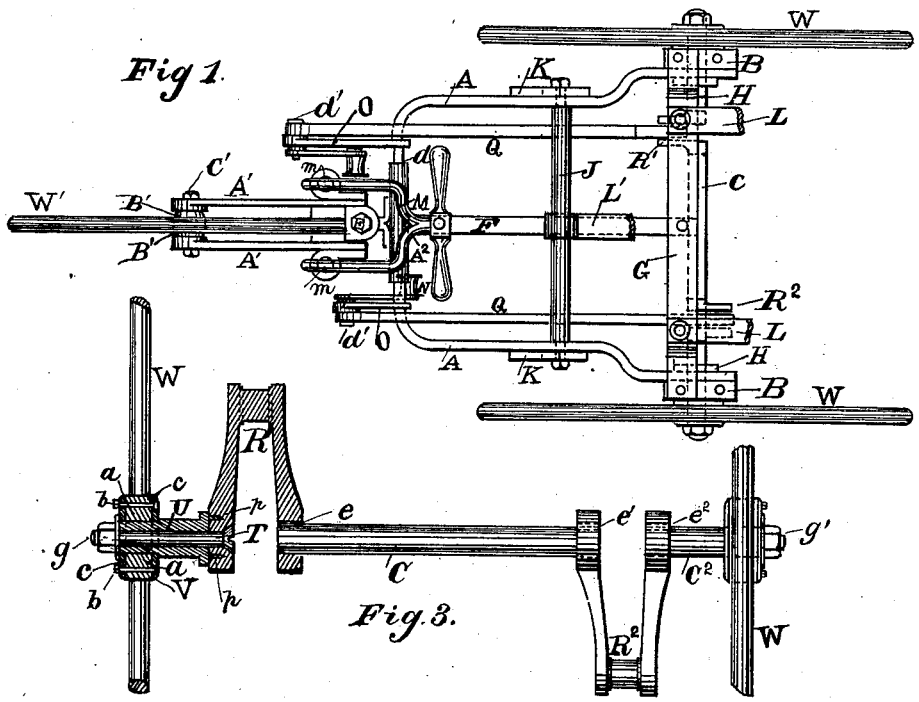
*Fig. 1.*
*Fig. 3.*
WITNESSES:
Fred. C. Fraentzel
C. R. Bennett
INVENTOR
Henrich Thiessen
BY Drake & Co. ATTYS.

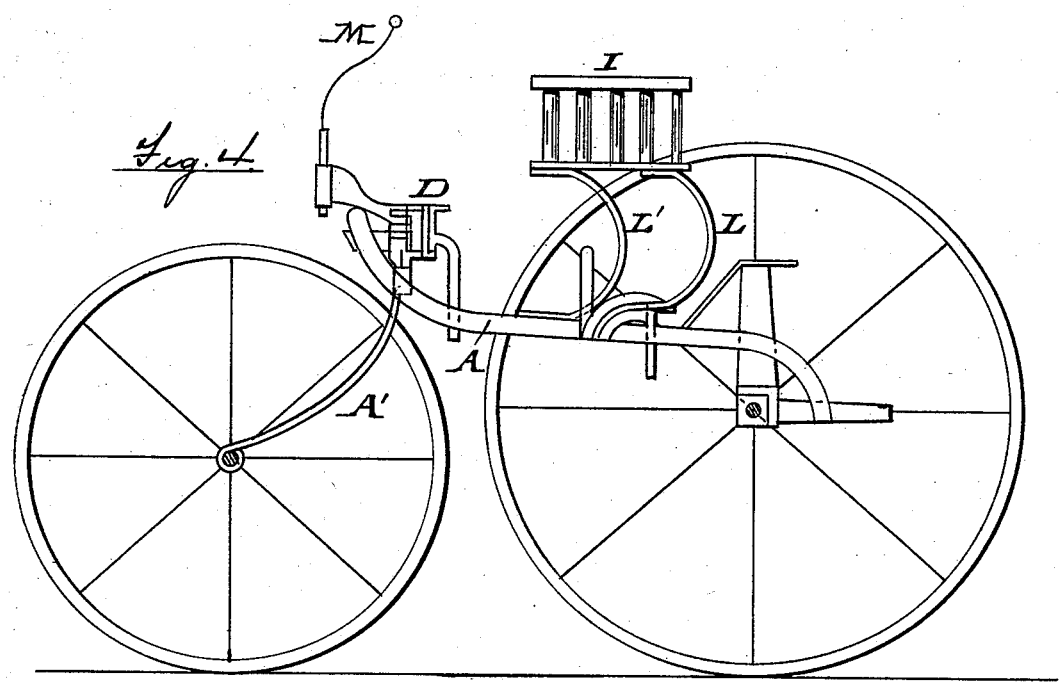

UNITED STATES PATENT OFFICE.

HEINRICH THIESSEN, OF NEWARK, NEW JERSEY.

TRICYCLE.

SPECIFICATION forming part of Letters Patent No. 364,782, dated June 14, 1887.

Application filed March 18, 1887. Serial No. 231,378. (No model.)

*To all whom it may concern:*

Be it known that I, HEINRICH THIESSEN, a citizen of the United States, residing at Newark, in the county of Essex and State of New Jersey, have invented certain new and useful Improvements in Tricycles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements in the construction of tricycles; and it consists in a peculiar combination and arrangement of the several parts constituting the propelling mechanism, as also in the means of securing one of the rear wheels rigidly to its axle, the other being free to turn loosely on said axle, thus preventing the other wheel from dragging when making short curves.

It also consists in certain means for securing the seat, whereby a free and easy motion is imparted thereto, and uncomfortable jolting is prevented when passing over obstacles or rough roads.

One object had in view is to reduce the cost of manufacture to a minimum, and still retain the requisite strength, by making the wheels of wood, and all other parts where applicable of hoop or band iron or steel.

In the accompanying drawings, in which similar letters of reference indicate like parts in each of the several figures, Figure 1, Sheet 1, represents a plan view of a tricycle (the seat being removed) embodying my improvements. Fig. 2 represents a vertical longitudinal section through line X X in Fig. 1. Fig. 3 represents the rear axle and cranks, a portion being in section, showing the arrangement for fastening one wheel securely to one end of said axle. Fig. 4 represents an elevation showing a modification of the vehicle.

In said drawings, A A, Figs. 1 and 2, designate a frame or yoke, preferably made of band iron or steel, and bolted to bearings B B on the rear axle, C.

A' A' designate standards, which are preferably made of spring-steel, firmly bolted or otherwise secured to a head, D, at one end, and at the other end are formed the front wheel-bearings, B' B', for the axle of the wheel W'. Said head D is secured to a frame or yoke, A A, the opposite ends of which yoke are secured to the rear axle, C.

F is a central bar, preferably of wood, one end of which is secured at $A^2$ to the yoke A, and its other end to a cross-piece, G, of band iron or steel, said cross-piece being secured at its ends by means of wrought angle-irons H H to said yoke A A and bearings B B.

I, Fig. 2, designates a seat, which, if desired, may be large enough to seat two persons. Said seat is secured by means of springs L and L' to said cross-piece G and to a transverse rod, J, respectively, said rod J being secured at its ends by means of nuts or otherwise to wrought-iron arms K K, located at the sides of the frame A A, as will be understood by referring to Figs. 1 and 2.

M is a steering device having forked arms, the ends of which are adjusted into corresponding sockets, m m, secured to the standards A' A' and to the head D, which head turns upon its pivot and operates the front wheel, W', to turn the machine, as will be understood by reference to Figs. 1 and 2. Said standards being made of spring-steel, owing to their elasticity, (see Fig. 4,) afford a yielding bearing to the front wheel, and are secured to a spindle, E, which is pivotally adjusted in the head D, thereby forming a pivot upon which the front wheel is turned to the right or to the left, and in steering is eccentric to the axle of said wheel, which is several inches forward of said pivot, as will be seen and understood by reference to Figs. 1 and 2, and by which construction the tricycle is capable of being turned upon a very short curve by a comparatively slight turn upon said spindle, and owing to the fact that as the forward wheel is turned to the right or to the left the forward peripheries of the rear wheels turn correspondingly in an opposite direction, as will be understood by referring to said Figs. 1 and 2.

Motion is transmitted to the vehicle by the rider by means of treadles N N, which are adjustable up or down in the slots of the arms O O, to which they are secured, which arms are pivotally connected at one end with the head at d, and at the other with the connecting-rods Q Q, at d' d', which rods connect with the cranks R R of the rear shaft, C. When two persons are riding side by side, each places one foot on a treadle, while the other foot rests in stirrups P, located at each side of the machine, and are adjustable. Said stirrups P, Fig. 1, also serve to brace the rider, as well as for rests for the feet. When going downgrade, the treadles are not used, and this whether there be one or two riding. Said stirrups are adjusted in slotted holders S, so as to enable the riders to adjust them, especially when climbing a steep grade, so as to enable him to throw his weight thereon to the very best advantage to secure the maximum of power, as will be manifest.

The method of securing one of the rear wheels rigidly to the axle C is plainly shown in Fig. 3, in which the wheel is represented as secured by an angular bearing upon an arm, U, which is rigidly secured to the crank-shaft C by means of a bolt, T, and steadying-pins $p$ $p$, said wheel being firmly held in place by means of shoulders on said arm U, and a flange screw-nut, $g$, upon the outer end of said bolt T. If the wheels be made of wood, I provide the hub with two steel plates, $c$ $c$, one on each side, firmly bolted and secured to said hub, as plainly shown in said Fig. 3, so as to make a bearing perfectly rigid.

The modification shown in Fig. 4, Sheet 2, represents in side elevation the standards A' A' turned horizontally, so as to form spring-bearings for the front wheel, as before mentioned.

Having thus described my invention, what I claim as new, and desire to secure by Letters Patent, is—

1. In a tricycle, the combination of slotted arms O O, connecting-rods Q Q, and cranks R R, as and for the purpose set forth.

2. In a tricycle, the combination of slotted arms O O, and treadles N N, adjustably connected therewith, as described, and for the purpose set forth.

3. In a tricycle, the combination of the cross-bar G, rib F, springs L L', and seat I, supported thereon, as described.

4. In a tricycle, the combination of the arm or sleeve U, secured to the crank-shaft C, and one wheel, W, secured to said sleeve and arranged to turn therewith, substantially as and for the purpose described.

In testimony that I claim the foregoing I have hereunto set my hand this 19th day of February, 1887.

HEINRICH THIESSEN.

Witnesses:
OLIVER DRAKE,
OSCAR A. MICHEL.